(12) United States Patent
Potekev et al.

(10) Patent No.: US 6,419,365 B1
(45) Date of Patent: Jul. 16, 2002

(54) ASYMMETRICAL TUNNEL FOR SPATIALLY INTEGRATING LIGHT

(75) Inventors: Franc Potekev, Wilsonville; Mark Peterson; Kurt Stahl, both of Lake Oswego; Scott Engle, Tualatin, all of OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/557,095

(22) Filed: Apr. 21, 2000

(51) Int. Cl.[7] .................... G03B 21/28; G03B 21/14; G03B 21/00; H04N 9/12; G02B 6/00
(52) U.S. Cl. .................... 353/98; 353/31; 353/84; 348/743; 385/133
(58) Field of Search .................... 353/31, 33, 34, 353/37, 38, 98, 99, 84; 348/742, 743, 771; 385/133, 901; 349/5, 7

(56) References Cited

U.S. PATENT DOCUMENTS

| | | | | |
|---|---|---|---|---|
| 5,241,170 A | * | 8/1993 | Field, Jr. et al. | 250/214 VT |
| 5,303,084 A | | 4/1994 | Pflibsen et al. | 359/503 |
| 5,829,858 A | * | 11/1998 | Levis et al. | 353/122 |
| 5,844,588 A | | 12/1998 | Anderson | 347/135 |
| 5,884,991 A | * | 3/1999 | Levis et al. | 353/122 |
| 5,967,636 A | * | 10/1999 | Stark et al. | 353/84 |
| 5,978,051 A | | 11/1999 | Gohman et al. | 348/766 |
| 6,005,722 A | * | 12/1999 | Butterworth et al. | 359/712 |
| 6,024,453 A | | 2/2000 | Edlinger et al. | 353/84 |
| 6,144,420 A | * | 11/2000 | Jung | 349/8 |
| 6,155,687 A | * | 12/2000 | Peterson | 353/84 |
| 6,224,216 B1 | * | 5/2001 | Parker et al. | 353/31 |
| 6,227,682 B1 | * | 5/2001 | Li | 362/302 |
| 6,356,700 B1 | * | 3/2002 | Strobl | 385/147 |
| 2002/0027642 A1 | * | 3/2002 | Nishida et al. | 353/53 |

* cited by examiner

*Primary Examiner*—Russell Adams
*Assistant Examiner*—Melissa Koval
(74) *Attorney, Agent, or Firm*—Stoel Rives LLP (57) ABSTRACT

A projector includes a source of polychromatic light that propagates through color filter segments of a color wheel and enters an input aperture of an asymmetrical light integrating tunnel that integrates the filtered light into a uniform pattern at a nonrectangular output aperture of the tunnel. The uniform illumination exiting the nonrectangular output aperture is re-imaged onto a light valve that is mounted obliquely to a longitudinal axis of the tunnel. The image of the nonrectangular output aperture on the light valve compensates for any keystone distortion, illumination overfill and illumination drop-off regions on the light valve, thereby increasing brightness and brightness uniformity across the light valve. The asymmetrical light integrating tunnel may include a trapezoidal input aperture that reduces the time period when adjacent color wheel filter segments are traversing the input aperture, thereby increasing the time period when the input aperture receives light from each single filter segment.

11 Claims, 6 Drawing Sheets

ASYMMETRICAL TUNNEL FOR SPATIALLY INTEGRATING LIGHT

RELATED APPLICATIONS

Not Applicable

FEDERALLY SPONSORED RESEARCH OR DEVELOPMENT

Not Applicable

TECHNICAL FIELD

This invention relates to an image display systems, and more particularly, to an asymmetrical light integrating tunnel that improves the uniformity and brightness of images produced by color video projection displays.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven light valve, such as a liquid crystal display ("LCD") or a digital micro mirror device ("DMD").

A popular type of multimedia projection system employs a light source and optical path components upstream and downstream of the image-forming device to project the image onto a display screen. An example of a DMD-based multimedia projector is the model LP420 manufactured by In Focus Systems, Inc., of Wilsonville, Oreg., the assignee of this application.

Significant effort has been invested into developing projectors producing bright, high-quality, color images. However, the optical performance of conventional projectors is often less than satisfactory. For example, suitable projected images having suitable uniform brightness are difficult to achieve, especially when using compact portable color projectors in a well-lighted room.

Because LCD displays have significant light attenuation and triple path color light paths are heavy and bulky, portable multimedia projectors typically employ DMD displays in a single light path configuration. Producing a projected color image with this configuration typically requires employing some form of sequential color modulator, such as a color shutter, color-switchable light source, multiple light-emitting diode arrays, or a color wheel, to generate a frame sequential color image. Unfortunately, such color modulators often produce minimal light intensity and/or have significant light attenuation.

The use of color wheels in frame sequential color ("FSC") display systems has been known for many years and was made famous (or infamous) in early attempts to develop color television sets. With technological advances, however, color wheel display implementations are still useful because of their simplicity, color purity, and inherent image convergence.

Figure 1:
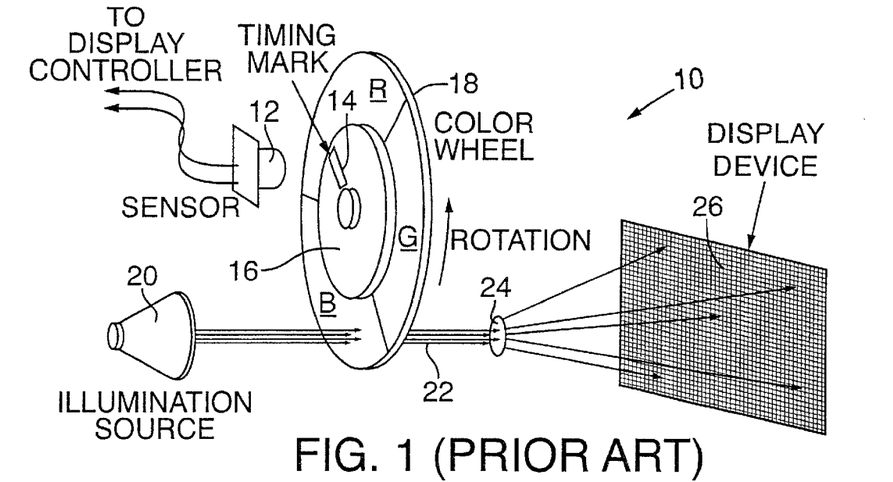
FIG. 1 is a simplified pictorial diagram showing the operating principle of a prior art FSC display device employing a color wheel and a transmissive light valve, such as an LCD.

FIG. 1 shows a typical prior art FSC display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24. onto a display device 26, such as an LCD-based light valve. A display controller (not shown) drives display device 26 with sequential red, green, and blue image data that are timed to coincide with the propagation of light beam 22 through the respective filter segments R, G, and B of color wheel 18.

Figure 2:
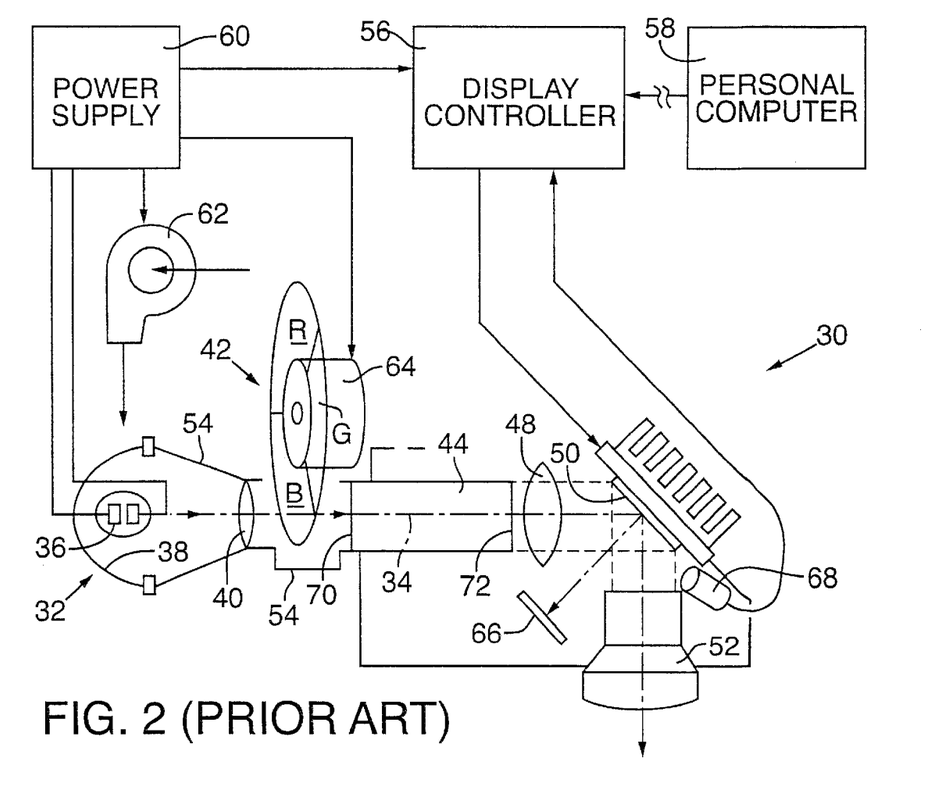
FIG. 2 is a simplified pictorial and electrical block diagram of a prior art multimedia projector showing a light path employing a color wheel, a rectangular light integrating tunnel, and an obliquely mounted reflective light valve, such as a DMD.

FIG. 2, shows a prior art multimedia projector 30 capable of projecting images having increased, uniform brightness relative to the LCD-based display of FIG. 1. A light source 32 emits polychromatic light that propagates along an optical path 34 through projector 30. Light source 32 generates intense light by employing a metal halide arc lamp 36 and an elliptical reflector 38. Optical path 34 includes a condenser lens 40, a color wheel 42, a rectangular light integrating tunnel 44, a relay lens 48, a DMD 50, and a projection lens 52. The optical components are held together by an optical frame 54 that is enclosed within a projector housing (not shown). A display controller 56 receives color image data from a PC 58 and processes the image data into frame sequential red, green, and blue image data, sequential frames of which are conveyed to DMD 50 in proper synchronism with the angular position of color wheel 42. A power supply 60 is electrically connected to light source 32 and display controller 56 and also powers a cooling fan 62 and a free running DC motor 64 that rotates color wheel 42. Display controller 56 controls DMD 50 such that light propagating from relay lens 48 is selectively reflected by DMD pixel mirrors either toward projection lens 52 or toward a light-absorbing surface 66 mounted on or near optical frame 54.

DC motor 64 rotates color wheel 42 at about 6,650 to 7,500 rpm. Color wheel 42 includes color filter segments R, G, and B that each surround about 120 degrees of color wheel 42. Color wheel synchronization is achieved by optically detecting which color filter segment is in optical path 34 and for how long. Particular colors of light propagating through color wheel 42 are sensed by a color selective light sensor 68 to generate synchronization timing data. Light sensor 68 is positioned off optical path 34 to receive scattered light.

To increase projected image brightness uniformity, a rectangular input aperture 70 of light integrating tunnel 44 collects a majority of the light exiting color wheel 42 and homogenizes the light during propagation through tunnel 44 to a rectangular output aperture 72. Light exiting output aperture 72 is focused by relay lens 48 onto DMD 50. However, because DMD 50 is tilted obliquely to optical path 34, the image of output aperture 72 on DMD 50 is Keystone distorted, causing image overfill at the far end of DMD 50 resulting in light loss, reduced brightness, and brightness nonuniformity across DMD 50.

Conventional light integrating tunnels typically have rectangular input and output apertures and may be formed as either an air-tunnel with reflective inside surfaces or may be a solid optical material, such as glass, quartz, or plastic with polished outer surfaces. For air tunnels, the light is reflected off the reflective inside surfaces, and for solid tunnels the light is totally internally reflected off the polished outer surfaces. Because the input and output apertures are rectangular, the four tunnel walls are perpendicular at their abutting edges.

There are other previously known light integrating tunnel designs that compensate for various light path-related illumination nonuniformities. For example, U.S. Pat. No. 5,303,084 for LASER LIGHT BEAM HOMOGENIZER AND IMAGING LIDAR SYSTEM INCORPORATING SAME describes a rectangular light integrator tunnel having tapered curved recesses extending between its input and output apertures for adjusting the uniformity of the light beam exiting the integrator. In another example, U.S. Pat. No. 5,844,588 for DMD MODULATED CONTINUOUS WAVE LIGHT SOURCE FOR XEROGRAPHIC PRINTER describes a wedge-shaped light integrator tunnel for providing anamorphic illumination of a wide aspect ratio DMD. However, neither conventional integrating tunnels nor either patent addresses the above-described excess overfill problem caused by oblique illumination of a DMD.

What is needed, therefore, is a way of capturing as much of the light propagated through a color modulator as possible and uniformly imaging the light on an obliquely positioned reflective light valve without light overfill.

SUMMARY OF THE INVENTION

An object of this invention is, therefore, to provide an apparatus and a method for capturing as much of the light propagated through a color modulator as possible and uniformly imaging the light on an obliquely positioned reflective light valve without light overfill.

Another object of this invention is to provide an integrator tunnel having an input aperture shaped to optimally collect light propagated through a color modulator.

A further object of this invention is to provide an integrator tunnel having an output aperture shaped and/or angled to optimally image homogenized light onto an obliquely positioned reflective light valve.

Still another object of this invention is to provide an integrator tunnel that combines the above-described objects into a single light integrator tunnel.

In a first embodiment of this invention, a multimedia projector includes a source of polychromatic light that propagates through color filter segments of a color modulator, such as a color wheel, and enters a rectangular input aperture of an asymmetrical light integrating tunnel that spatially integrates the light into a spatially uniform pattern as it exits a nonrectangular output aperture of the tunnel. The uniform illumination exiting the nonrectangular output aperture is re-imaged by a relay lens onto a reflective light valve that is mounted obliquely to the longitudinal axis of the tunnel.

An advantage of the light tunnel of this invention is that the image of the nonrectangular output aperture on the light valve compensates for any Keystone distortion, illumination overfill regions, and illumination drop-off regions, thereby preventing light loss, increasing brightness, and brightness uniformity across the light valve.

In another embodiment of this invention, the asymmetrical light integrating tunnel further includes a trapezoidal input aperture that further improves illumination brightness of the multimedia projector by solving the following problem. When a color wheel is employed, the filter segments are separated by areas referred to as "spokes" that traverse the input aperture such that portions of different colored filter segments are both propagating light into the light integrating tunnel at the same time. To prevent this condition from causing color impurities or loss of brightness in the projected image, a display controller "turns off" the light valve during time periods when the spokes are traversing the input aperture. The trapezoidal input aperture allows the light valve to be turned off for a substantially shorter than conventional time period because the spokes traverse a smaller timing angle that is bounded by the sloping edges of the trapezoidal input aperture.

An advantage of the trapezoidal input aperture is that the resulting smaller timing angle allows a longer light valve on time such that less light is lost and projected image brightness is improved. This is particularly advantageous when the light source beam spot significantly overfills the input aperture.

Another advantage of the trapezoidal input aperture is that it simplifies fabrication of many asymmetrical light tunnel shape configurations.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 3:
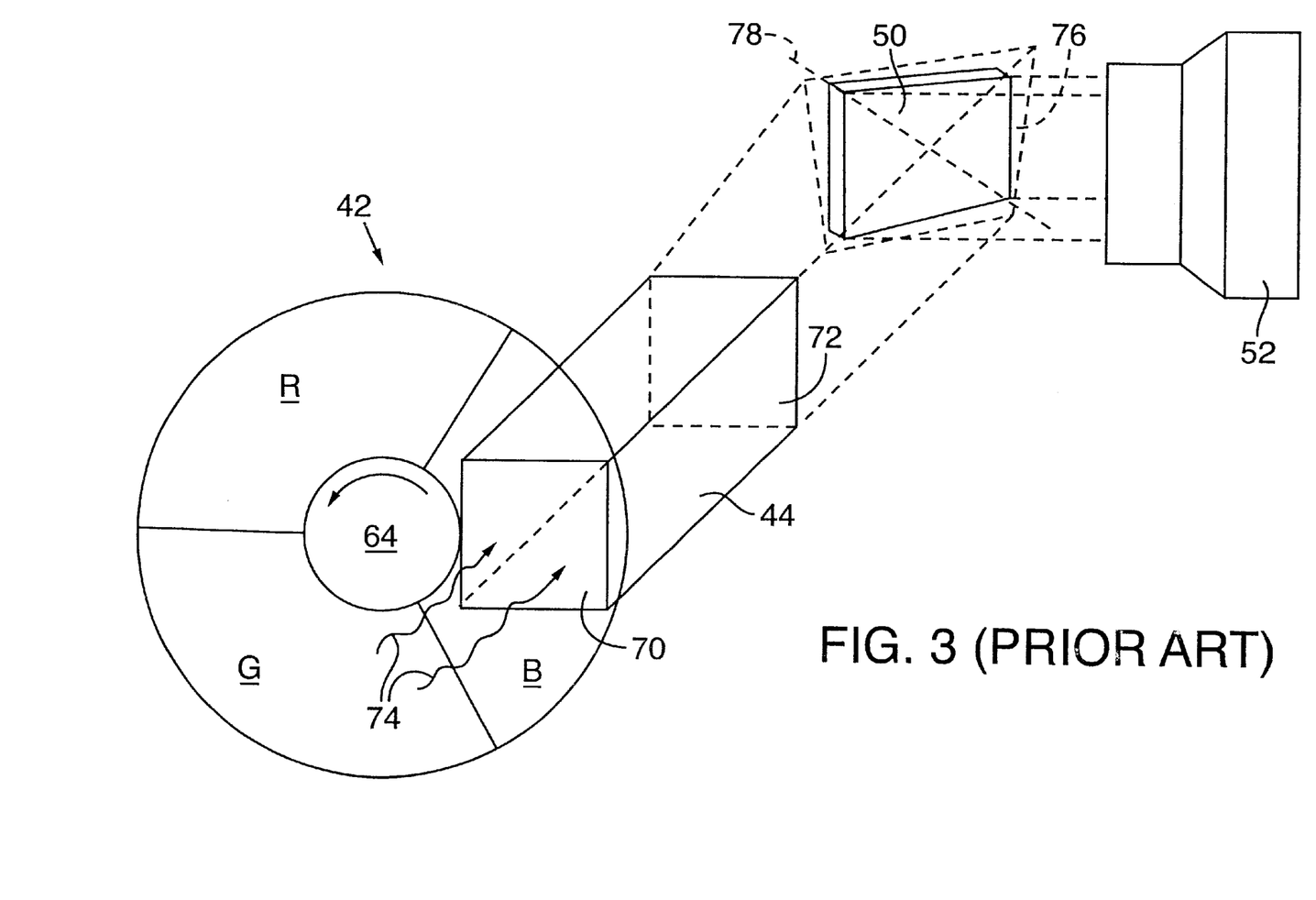
FIG. 3 is a simplified oblique pictorial view of a portion of the multimedia projector of FIG. 2 showing the color wheel, rectangular light integrating tunnel, and a resulting light overfill pattern on the obliquely mounted reflective light valve.

FIG. 3 show portions of prior art multimedia projector 30 including a color modulator, such as color wheel 42, light integrating tunnel 44, DMD 50, and projection lens 52. As explained in the background, polychromatic light 74 propagates through filter segments R, G, and B of color wheel 42 and enters rectangular input aperture 70 of light integrating tunnel 44.

Light integrating tunnel 44, also referred to as a light spatial-integrator or lightpipe, is a well known component employed to spatially integrate (scramble or average) the light entering rectangular input aperture 70 into a more spatially uniform pattern as it exits rectangular output aperture 72. In particular, light integrating tunnel 44 receives at rectangular input aperture 70 a circular spatial intensity pattern, and spatially reorganizes or integrates it into a non-symmetric intensity pattern to provide a uniform illumination brightness across rectangular output aperture 72. Otherwise, the illumination would have a "hotspot" in the center and diminished brightness toward its corners.

The resulting uniform illumination exiting rectangular output aperture 72 is re-imaged by relay lens 48 (FIG. 2) onto DMD 50 to satisfy the Abbé (critical) illumination condition. However, because DMD 50 is tilted obliquely to the optical path, the image of rectangular output aperture 72 on DMD 50 is Keystone distorted, causing an image overfill region 76 at the far end of DMD 50 resulting in light loss, reduced brightness, and brightness nonuniformity across DMD 50.

In actual practice, the micromirrors in DMD 50 each rotate about a pivot axis 78 that extends diagonal to the rectangular face of DMD 50. Accordingly, the optimal DMD 50 illumination angle is perpendicular to and slightly below pivot axis 78. Therefore, in addition to being Keystone distorted, the image of rectangular output aperture 72 on DMD 50 is also somewhat elongated.

Figure 4:
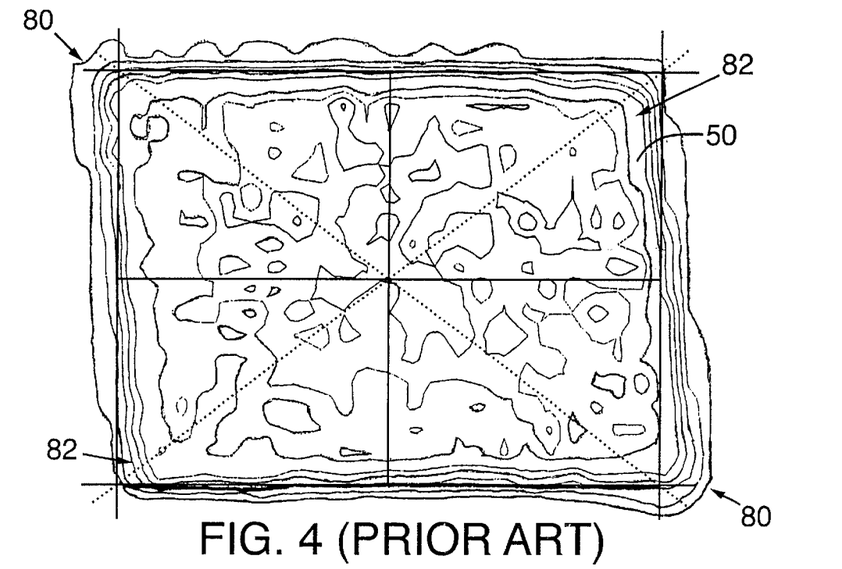
FIG. 4 is a computer simulated plot showing lines of constant illumination across the surface of the reflective light valve of FIG. 3.

FIG. 4 shows a computer simulation plot representing lines of constant illumination across the surface of DMD 50 when illuminated by prior art light integrating tunnel 44. The plot was generated using ASAP Pro simulation software manufactured by Breault Research Organization, Inc., located in Tucson, Ariz. Note the illumination overfill regions 80 at opposite corners of DMD 50 that contain lost light that cannot be reflected by micromirrors in DMD 50. Note also the illumination drop-off regions 82 at the other opposite corners of DMD 50 that represent areas where DMD 50 illumination rapidly diminishes such that light reflected therefrom will have noticeably less brightness than light reflected from other areas of DMD 50. The overall results of this distorted and elongated illumination of DMD 50 is a projected image having two shadowed corners and less than optimal overall brightness.

Figure 5:
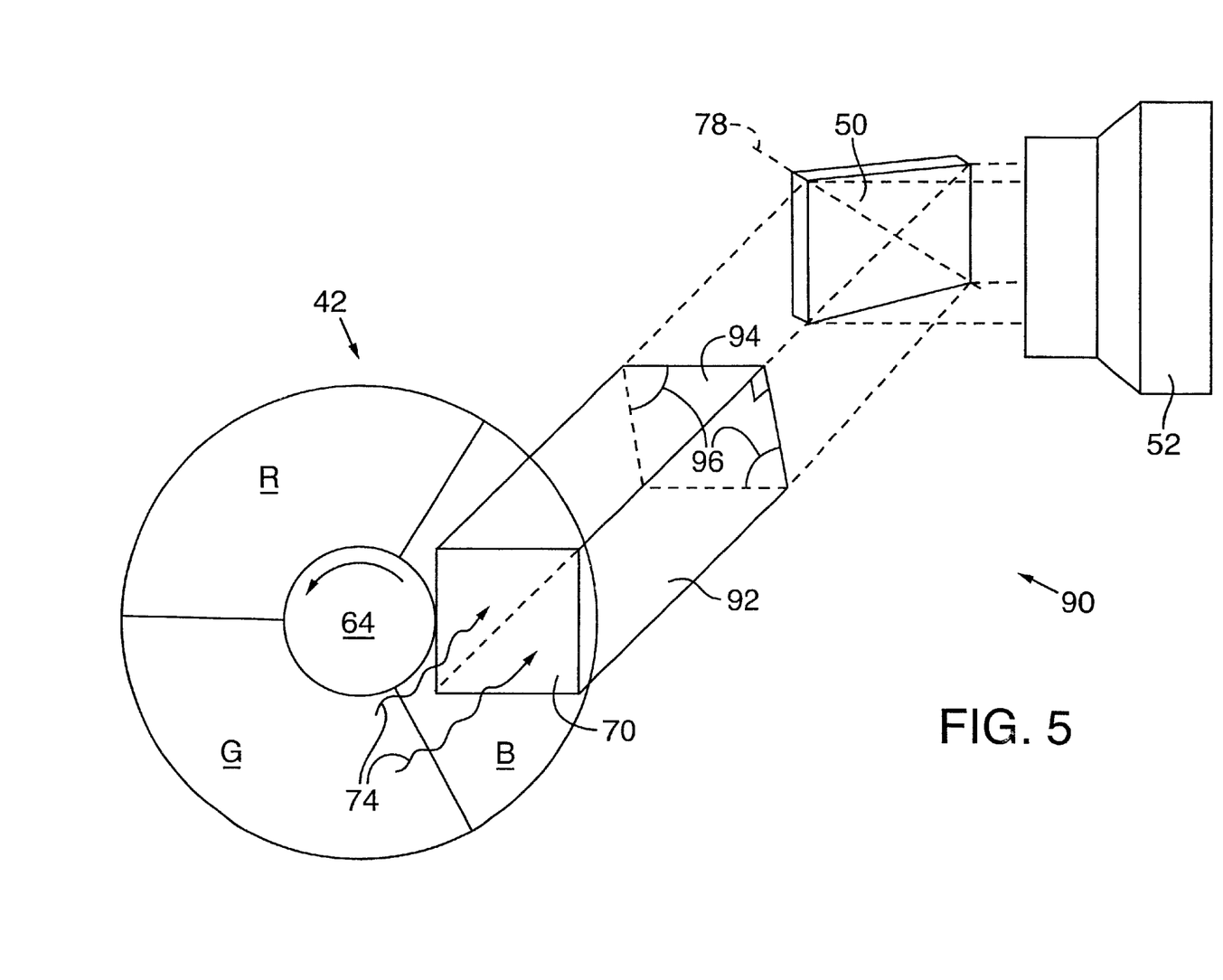
FIG. 5 is a simplified oblique pictorial view of a portion of a multimedia projector showing a color wheel, asymmetrical light integrating tunnel of this invention, and a resulting uniform light pattern imaged on an obliquely mounted reflective light valve.

FIG. 5 shows a portion of a multimedia projector 90 of this invention including color wheel 42, an asymmetrical light integrating tunnel 92 of this invention, and a resulting uniform light pattern imaged on obliquely mounted DMD 50. In this invention, polychromatic light 74 propagates through filter segments R, G, and B of color wheel 42 and enters rectangular input aperture 70 of asymmetrical light integrating tunnel 92, which spatially integrates the filtered light entering rectangular input aperture 70 into a more spatially uniform pattern as it exits a nonrectangular output aperture 94. In this embodiment, rectangular input aperture 70 and nonrectangular output aperture 94 are parallel to one another and each are substantially perpendicular to the walls of asymmetrical light integrating tunnel 92. In a preferred embodiment, nonrectangular output aperture 94 is shaped as a parallelogram having acute included angles 96 that are each about 87 degrees.

The resulting uniform illumination exiting nonrectangular output aperture 94 is re-imaged by relay lens 48 (FIG. 2) onto DMD 50. However, in this invention the image of nonrectangular output aperture 94 on DMD 50 is intentionally distorted to compensate for any Keystone distortion, illumination overfill regions, and illumination drop-off regions, thereby preventing light loss, increasing brightness, and brightness uniformity across DMD 50.

In this embodiment, color wheel 42 may be replaced by any of the previouslymentioned color modulators and may be positioned at either end of light integrating tunnel 92.

Figure 6:
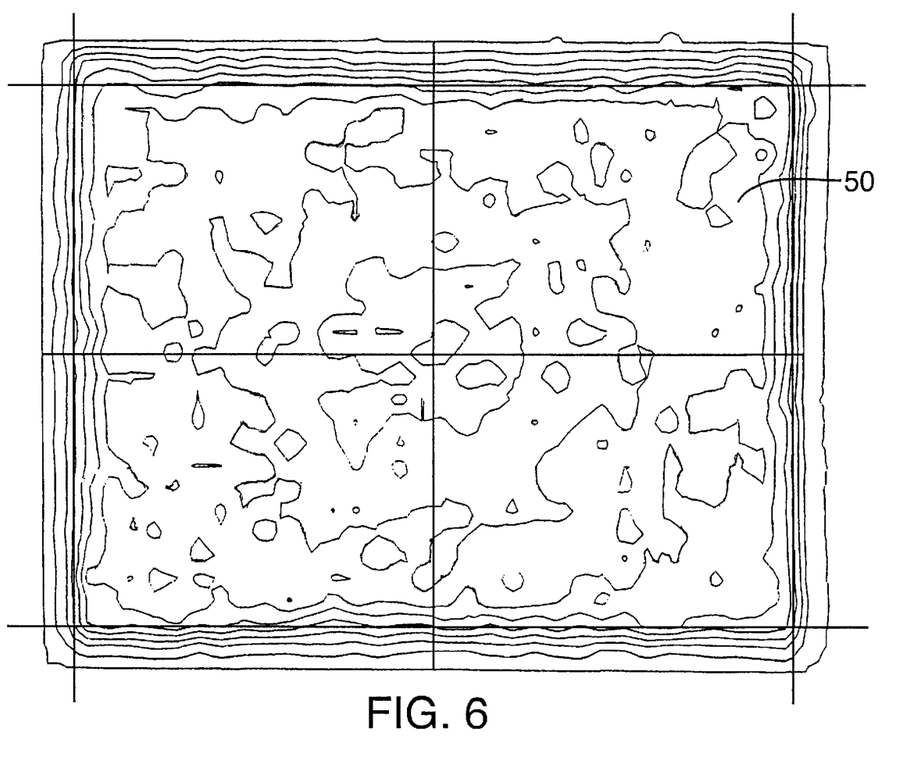
FIG. 6 is a computer simulated plot showing lines of constant illumination across the surface of the reflective light valve of FIG. 5.

FIG. 6 shows a computer simulation plot representing lines of constant illumination across the surface of DMD 50 when illuminated by asymmetrical light integrating tunnel 92 of this invention. Note the substantial lack of illumination overfill regions and illumination drop-off regions.

Figure 7:
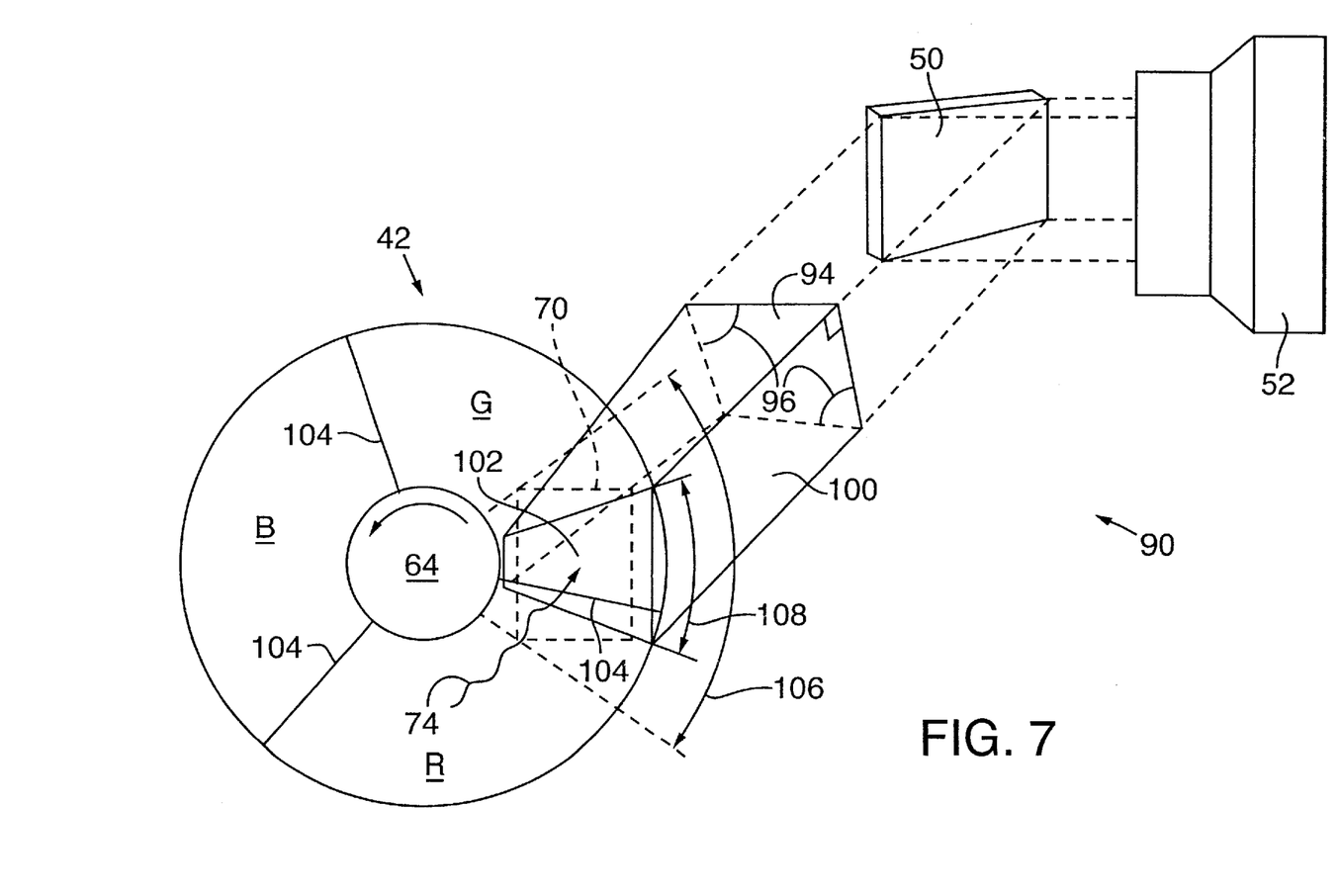
FIG. 7 is a simplified oblique pictorial view of a portion of a multimedia projector showing an asymmetrical light integrating tunnel having a trapezoidal input aperture of this invention.
Figure 8A:
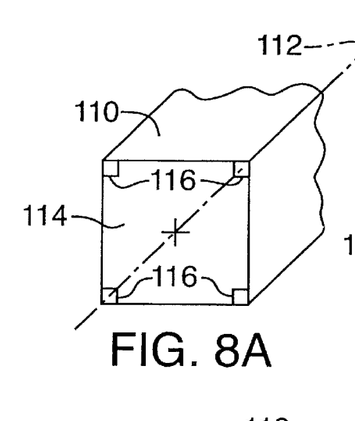
FIGS. 8A to 8H are simplified oblique pictorial views of multiple light integrating tunnel input and output aperture embodiments of this invention.
Figure 8B:
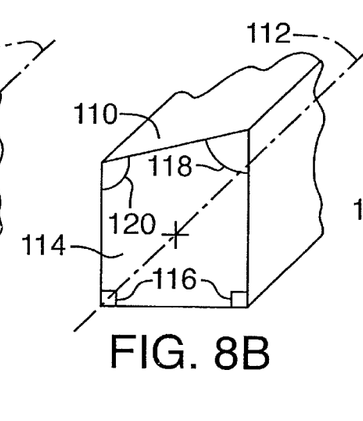
Figure 8C:
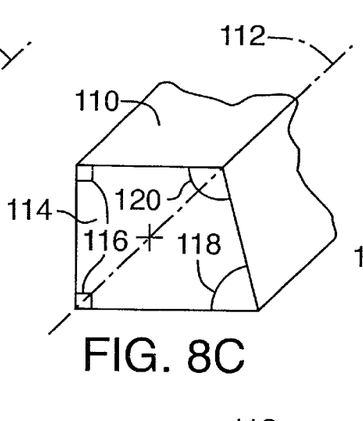
Figure 8D:
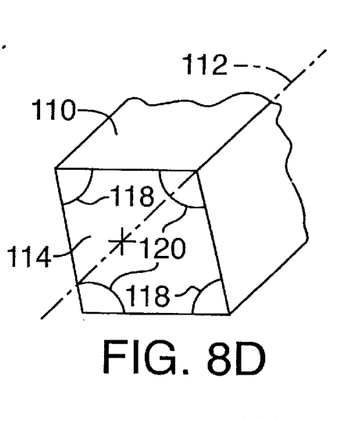
Figure 8E:
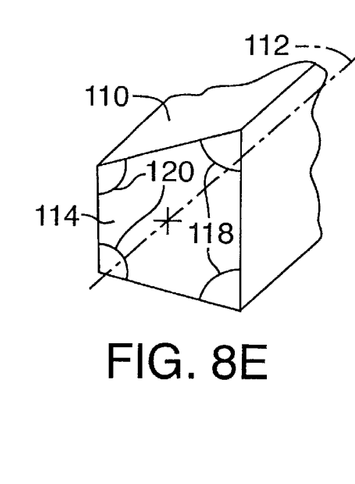
Figure 8F:
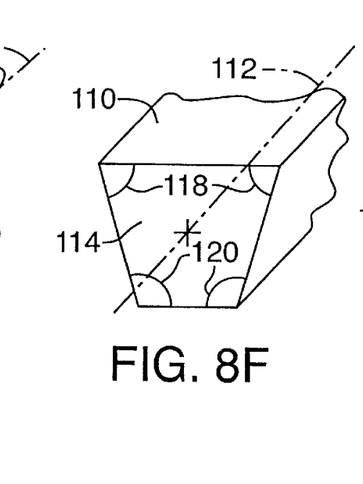
Figure 8G:
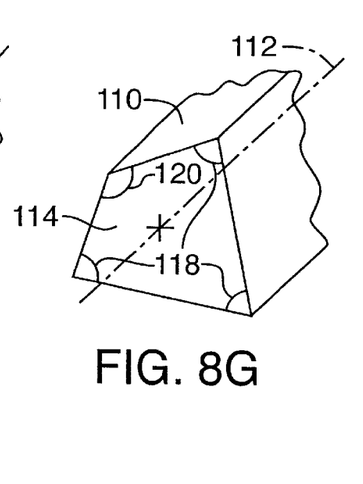
Figure 8H:
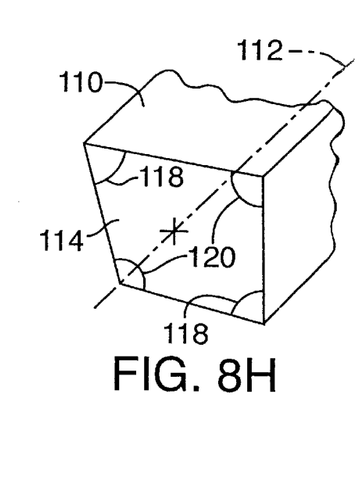

FIG. 7 shows another embodiment of multimedia projector 90 in which asymmetrical light integrating tunnel 92 is replaced by an asymmetrical light integrating tunnel 100 that further includes a trapezoidal input aperture 102, which has the same cross-sectional area as prior rectangular input aperture 70 (FIGS. 3 and 5). In this embodiment, polychromatic light 74 propagates through filter segments R, G, and B of color wheel 42, enters trapezoidal input aperture 102 of asymmetrical light integrating tunnel 100, and exits nonrectangular output aperture 94 as described with reference to FIG. 5. Trapezoidal input aperture 102 and nonrectangular output aperture 94 are parallel to one another and each are substantially perpendicular to the walls of asymmetrical light integrating tunnel 100.

In this embodiment trapezoidal input aperture 102 further improves the illumination brightness of multimedia projector 90 by solving the following problem. Filter segments R, G, and B are separated by regions referred to as spokes 104. In FIG. 7, the one of spokes 104 separating filter segments R and G is shown rotated into a position traversing trapezoidal input aperture 104 such that portions of filter segments R and G are both propagating light into asymmetrical light integrating tunnel 100. To prevent this spoke overlapping condition from causing color impurities in the projected image, display controller 56 (FIG. 2) "turns off" DMD 50 during time periods when spokes 104 are traversing the input aperture. For prior art rectangular input aperture 70 (shown in dashed lines), DMD 50 is turned off for a relatively long time because spokes 104 must traverse a relatively large timing angle 106. However, when trapezoidal input aperture 102 is employed, DMD 50 is turned off for a relatively shorter time because spokes 104 traverse a relatively smaller timing angle 108. The smaller timing angle 108 allows a longer DMD 50 on time such that less light is lost and projected image brightness is improved.

Asymmetrical light integrating tunnels of this invention have input and/or output apertures with at least two included angles being other than right angles. In particular, FIGS. 8A to 8H show multiple alternative light integrating tunnel input and/or output aperture embodiments of this invention that may be used in any combination to suit particular applications. An aperture having only one right included angle is not shown, but is contemplated by this invention. Of course, it is conventional to employ the rectangular shape of FIG. 8A for both the input and output apertures. FIGS. 8A to 8H each show a portion of a light integrating tunnel 110 through which extends a longitudinal axis 112. Each light integrating tunnel 110 terminates in a planar input or output aperture 114 that is perpendicular to longitudinal axis 112. Each aperture 114 can be generalized as a polygon having included angles that add up to 360 degrees. The included angles are combinations of right angles 116, acute angles 118, and obtuse angles 120.

The precise aspect ratio and included angles of a particular output aperture should be matched to the shape of a particular light valve by employing ray tracing that includes the aberration effects of any intervening optical elements, such as relay lens 48 (FIG. 2).

Asymmetrical light integrating tunnels of this invention are advantageous because they have improved spatial brightness uniformity at the output aperture as compared to conventional symmetrical light integrating tunnels of the same length. They are also advantageous because the asymmetrical shape of the output apertures is more readily mapped to the shape of light valve to achieve Abbe (Critical) illumination of the light valve with minimal light loss. They are further advantageous because a trapezoidal shape of the input aperture improves projected image brightness by substantially reducing the color wheel timing angle.

Skilled workers will recognize that portions of this invention may be implemented differently from the implementations described above for preferred embodiments. For example, the plane of the output aperture may be placed at a non perpendicular angle to the longitudinal axis of the light integrator tunnel to introduce an intentional Keystone distortion that compensates for Keystone distortion caused by the oblique mounting angle of the light valve or by an asymmetrical shape of the output aperture. Alternatively, the light valve may be a reflective CMOS, micro-mechanical device, or a liquid crystal on silicon device.

It will be obvious to those having skill in the art that many changes may be made to the details of the above-described embodiments of this invention without departing from the underlying principles thereof. Accordingly, it will be appreciated that this invention is also applicable to light integrating applications other than those found in color video projectors. The scope of this invention should, therefore, be determined only by the following claims.

We claim:

1. In a multimedia projector, an apparatus for increasing a brightness of a projected image, comprising:
    a source of light;
    a light integrating tunnel having a longitudinal axis extending between an input aperture having a trapezoidal shape and an output aperture having a nonrectangular shape;
    a color wheel disposed between the source of light and having filter segments that sequentially receive the light and propagate filtered light, in which adjacent ones of the filter segments simultaneously traverse the input aperture during rotation of the color wheel through a timing angle that is minimized by the trapezoidal shape of the input aperture; and
    a light valve mounted obliquely to the longitudinal axis of the light integrating tunnel, the light valve positioned to receive an illumination image of the uniform illumination pattern exiting the nonrectangular output aperture and propagate selected portions of the illumination image as the projected image, the illumination image being shaped by the nonrectangular shape of the output aperture such that the light valve is substantially free of illumination overfill regions and illumination drop-off regions, thereby increasing the brightness of the projected image.

2. The apparatus of claim 1 in which the input and output apertures are planar apertures that are positioned substantially perpendicular to the longitudinal axis of the light integrating tunnel.

3. The apparatus of claim 1 in which the output aperture has a trapezoidal shape.

4. The apparatus of claim 1 in which the output aperture has a shape characterized as a four sided polygon having at least two included angles that are not right angles.

5. The apparatus of claim 1 further including a relay lens positioned between the light integrating tunnel and the light valve to project the illumination image on the light valve.

6. The apparatus of claim 1 in which the light valve is a digital micromirror device, a reflective CMOS device, or a liquid crystal on silicon device.

7. In a multimedia projector, a method for increasing a brightness of a projected image, comprising:
    generating light;
    providing a light integrating tunnel having a longitudinal axis extending between an input aperture having a trapezoidal shape and an output aperture having a nonrectangular shape;
    providing a color wheel having filter segments for sequentially receiving the light and propagating filtered light to the light integrating tunnel such that adjacent filter segments simultaneously traverse the light integrating tunnel input aperture during rotation of the color wheel through a timing angle that is minimized by the trapezoidal shape of the input aperture;
    integrating in the light integrating tunnel the filtered light into a uniform illumination pattern at the output aperture;
    mounting a light valve obliquely to the longitudinal axis of the light integrating tunnel;
    imaging the uniform illumination pattern exiting the nonrectangular output aperture on the light valve as an illumination image; and
    propagating selected portions of the illumination image as the projected image, the illumination image being shaped by the nonrectangular shape of the output aperture such that the light valve is substantially free of illumination overfill regions and illumination drop-off regions, thereby increasing the brightness of the projected image.

8. The method of claim 7 in which the nonrectangular shape of the output aperture is a trapezoidal shape.

9. The method of claim 7 in which the input and output apertures are planar apertures and the method further includes positioning the input and output apertures substantially perpendicular to the longitudinal axis of the light integrating tunnel.

10. The method of claim 7 further including shaping the output aperture as a four sided polygon having at least two included angles that are not right angles.

11. The method of claim 7 further including positioning a relay lens between the light integrating tunnel and the light valve for imaging the uniform illumination pattern exiting the nonrectangular output aperture on the light valve.

* * * * *